US012776540B2

(12) United States Patent
Lee

(10) Patent No.: US 12,776,540 B2
(45) Date of Patent: Oct. 27, 2026

(54) BATTERY PACK INCLUDING FIRE SUPPRESSION MEANS

(71) Applicant: LG ENERGY SOLUTION, LTD., Seoul (KR)

(72) Inventor: Jin Kyu Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 860 days.

(21) Appl. No.: 17/791,739

(22) PCT Filed: Apr. 26, 2021

(86) PCT No.: PCT/KR2021/005229

§ 371 (c)(1), (2) Date: Jul. 8, 2022

(87) PCT Pub. No.: WO2021/230528

PCT Pub. Date: Nov. 18, 2021

(65) Prior Publication Data

US 2023/0030011 A1 Feb. 2, 2023

(30) Foreign Application Priority Data

May 13, 2020 (KR) ........................ 10-2020-0057035

(51) Int. Cl.

*H01M 50/24* (2021.01)
*H01M 50/207* (2021.01)
*H01M 50/581* (2021.01)

(52) U.S. Cl.

CPC ......... *H01M 50/24* (2021.01); *H01M 50/207* (2021.01); *H01M 50/581* (2021.01); *H01M 2200/108* (2013.01)

(58) Field of Classification Search

CPC .. H01M 50/24; H01M 50/207; H01M 50/581; H01M 2200/108; H01M 10/425;

(Continued)

(56) References Cited

U.S. PATENT DOCUMENTS

2010/0026242 A1* 2/2010 Forslow .................. B60L 50/16 338/53
2010/0127662 A1 5/2010 Ha et al.

(Continued)

FOREIGN PATENT DOCUMENTS

CN 101512826 A * 8/2009 ............ H02J 7/0029
CN 101626918 A 1/2010

(Continued)

OTHER PUBLICATIONS

EEpower, retrieved on Apr. 7, 2025 from https://eepower.com/resistor-guide/resistor-fundamentals/resistance-of-a-resistor/ (Year: 2025).*

(Continued)

*Primary Examiner* — Matthew T Martin
*Assistant Examiner* — Bartholomew A Hornsby
(74) *Attorney, Agent, or Firm* — Birch, Stewart, Kolasch & Birch, LLP

(57) ABSTRACT

A battery pack includes a means configured to, when an abnormal phenomenon, such as fire outbreak or heat generation, occurs in a battery cell, prevent fire or heat from propagating to another battery cell adjacent thereto. The battery pack includes a plurality of battery cells, a case configured to receive the plurality of battery cells, an energy discharging means configured to discharge energy of the battery pack when the abnormal phenomenon occurs, and a fire extinguishing means configured to discharge aerosol at an operating temperature or higher in order to extinguish flames generated in the battery pack.

10 Claims, 4 Drawing Sheets

400

(58) Field of Classification Search
CPC .. H01M 50/204; H01M 10/63; H01M 10/625; H01M 50/249; H01M 50/251; H01M 2200/00; H01M 2220/20; H01M 10/441; H01M 10/613; H01M 10/4257; H01M 2010/4271; H01M 2200/10; A62D 1/0071; Y02E 60/10
See application file for complete search history.

(56) References Cited

U.S. PATENT DOCUMENTS

| | | | | |
|---|---|---|---|---|
| 2010/0187465 | A1* | 7/2010 | Guo | A62D 1/0092 252/5 |
| 2011/0052951 | A1* | 3/2011 | Yang | H01M 50/298 429/90 |
| 2011/0059347 | A1* | 3/2011 | Lee | H01M 50/121 429/120 |
| 2012/0187814 | A1 | 7/2012 | Ha et al. | |
| 2012/0187914 | A1* | 7/2012 | Ha | H01M 10/441 320/134 |
| 2016/0346577 | A1* | 12/2016 | Ito | A62C 5/006 |
| 2020/0036047 | A1* | 1/2020 | Aikens | H01M 50/249 |
| 2023/0223606 | A1 | 7/2023 | Aikens et al. | |

FOREIGN PATENT DOCUMENTS

| | | | | | |
|---|---|---|---|---|---|
| CN | 109999398 | A | | 7/2019 | |
| CN | 210120216 | U | | 2/2020 | |
| JP | 2010-532687 | A | | 10/2010 | |
| JP | 2013-149523 | A | | 8/2013 | |
| JP | 2014-36714 | A | | 2/2014 | |
| JP | 2014-75906 | A | | 4/2014 | |
| JP | 2014-127269 | A | | 7/2014 | |
| JP | 2014158508 | A | * | 9/2014 | A62C 3/07 |
| JP | 2015-89170 | A | | 7/2015 | |
| JP | 2015123277 | A | * | 7/2015 | A62C 3/07 |
| JP | 2016-168255 | A | | 9/2016 | |
| JP | 2019-205487 | A | | 12/2019 | |
| JP | 2020-17517 | A | | 1/2020 | |
| KR | 10-2008-0023377 | A | | 3/2008 | |
| KR | 10-1067627 | B1 | | 9/2011 | |
| KR | 10-1145719 | B1 | | 5/2012 | |
| KR | 10-1706717 | B1 | | 3/2017 | |
| KR | 101949151 | B1 | * | 2/2019 | A62C 37/10 |
| KR | 2064416 | B1 | * | 1/2020 | A62C 3/16 |
| KR | 102064416 | B1 | * | 1/2020 | A62D 1/0028 |
| WO | WO 2017/213132 | A | | 12/2017 | |

OTHER PUBLICATIONS

Definitions of "Aerosol Product," Feb. 2012, retrieved on Apr. 7, 2025 from chrome-extension://efaidnbmnnnibpcajpcglclefindmkaj/https://www.nist.gov/system/files/documents/pml/wmd/Definitions-of-Aerosol-Product.pdf,. (Year: 2025).*

Rohilla et al. (Aerosol Forming Compositions for Fire Fighting Applications: A Review, Mar. 12, 2019, pp. 2532-2533.) (Year: 2019).*

Extended European Search Report for European Application No. 21805241.3, dated Jun. 12, 2024.

International Search Report (PCT/ISA/210) issued in PCT/KR2021/005229, Aug. 12, 2021.

Rohilla et al., "Aerosol Forming Compositions for Fire Fighting Applications: A Review". Fire Technology, vol. 55, No. 6, pp. 2515-2545).

* cited by examiner

【FIG. 1】
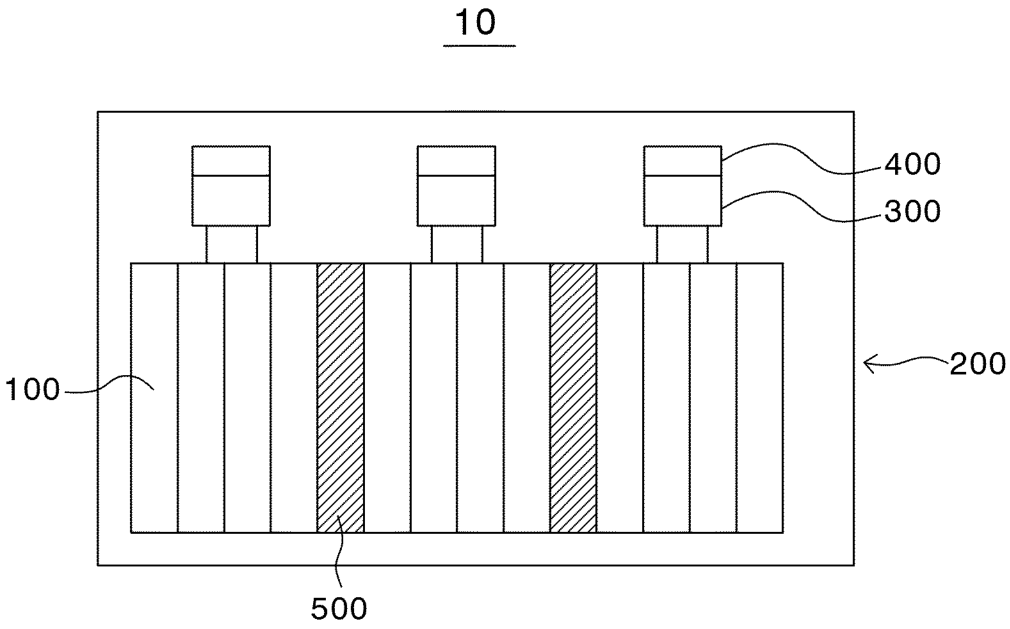

【FIG. 2】
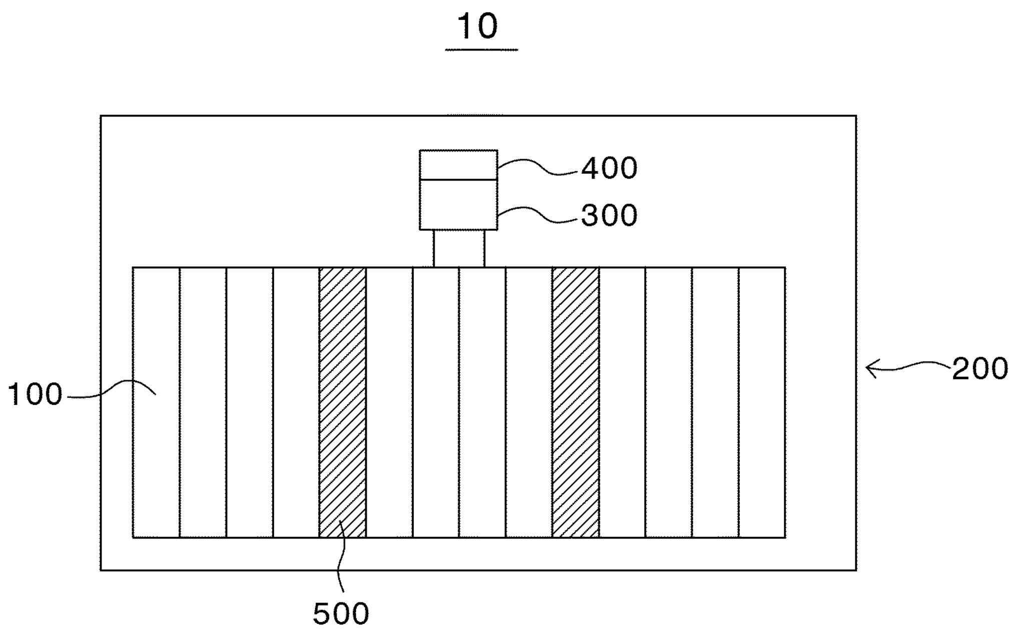

【FIG. 3】
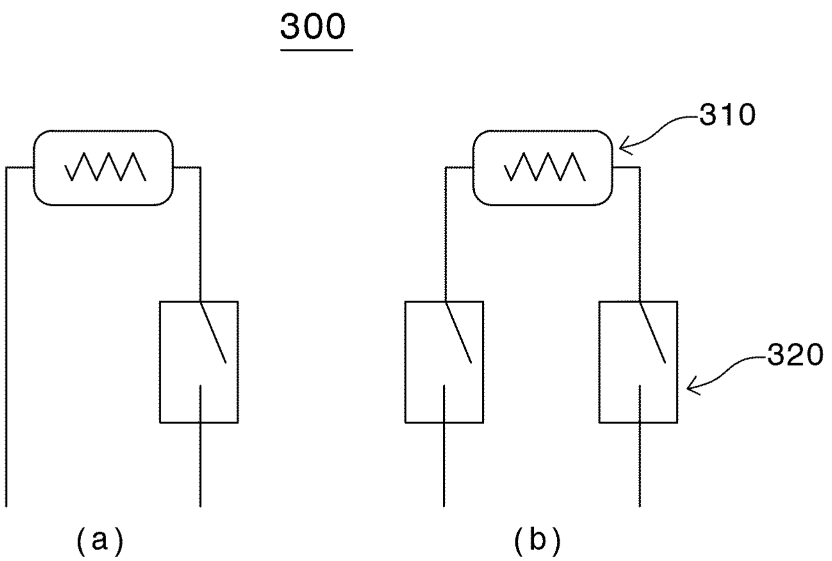

【FIG. 4】
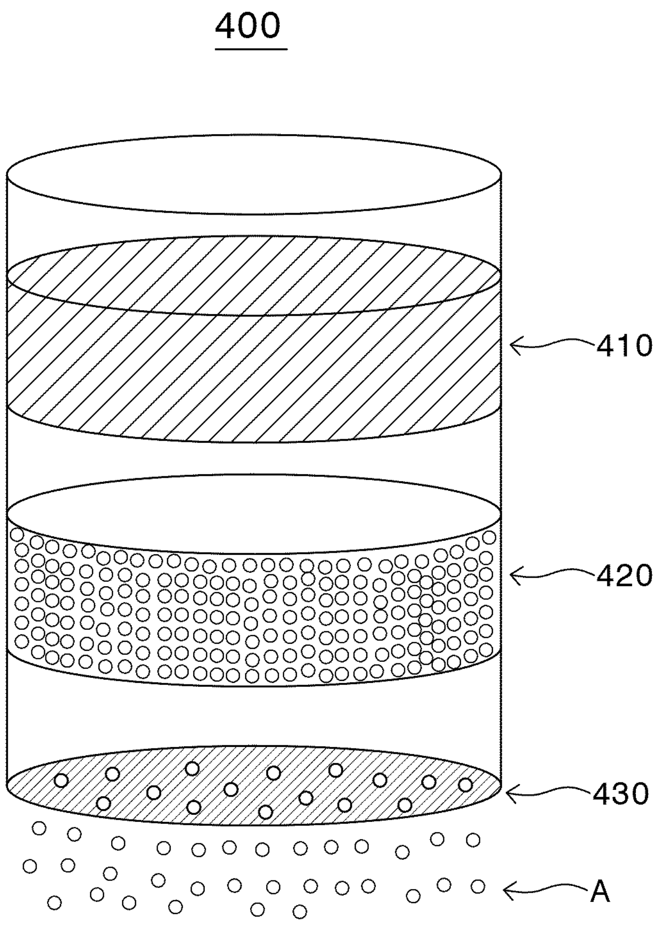

BATTERY PACK INCLUDING FIRE SUPPRESSION MEANS

TECHNICAL FIELD

This application claims the benefit of priority to Korean Patent Application No. 2020-0057035 filed on May 13, 2020, the disclosure of which is incorporated herein by reference in its entirety.

The present invention relates to a battery pack including an energy discharging means and a fire extinguishing means, whereby stability of the battery pack is improved.

BACKGROUND ART

With technological development of mobile devices, such as smartphones, laptop computers, and digital cameras, and an increase in demand therefor, research on secondary batteries, which are capable of being charged and discharged, has been actively conducted. In addition, secondary batteries, which are energy sources substituting for fossil fuels causing air pollution, have been applied to an electric vehicle (EV), a hybrid electric vehicle (HEV), a plug-in hybrid electric vehicle (P-HEV), and an energy storage system (ESS).

The energy storage system (ESS) is a system that stores a large amount of excess power in a battery in order to use the stored power when needed. The energy storage system serves to uniformly maintain quality of power in connection with new and renewable energy generation and to increase efficiency in use of power by storing power at the time when the amount of use of power is small and using the stored power when the demand for power is high. The ESS may mainly be classified as a grid system ESS, an uninterruptible power supply (UPS), or an ESS for domestic use.

There are a lithium ion battery, a lithium polymer battery, a nickel-cadmium battery, a nickel-hydride battery, and a nickel-zinc battery as secondary batteries that are widely used at present. The operating voltage of a unit secondary battery cell, i.e. a unit battery cell, is about 2.0V to 5.0V. In the case in which output voltage higher than the above operating voltage is required, therefore, a plurality of battery cells may be connected to each other in series to constitute a cell module assembly. In addition, cell module assemblies may be connected to each other in series or in parallel to constitute a battery module depending on required output voltage or charge and discharge capacities. In general, a battery pack is manufactured using at least one battery module by adding an additional component.

Since a lithium secondary battery has a danger of explosion and fire outbreak due to heat generation, however, one of the important problems is to secure safety thereof. If no appropriate measures are initially taken when an abnormal phenomenon occurs, the temperature of the secondary battery abruptly increases due to heat generation, and thermal runaway occurs due to such an abrupt increase in temperature, whereby the secondary battery may explode, and the heat propagates to another secondary battery adjacent thereto, and therefore a battery pack may greatly damaged. Methods of cooling or thermally insulating the lithium secondary battery in the battery pack may be used to secure safety of the batter pack. However, there is a problem in that it is not possible to dissipate thermal energy generated in the lithium secondary battery, which has high energy density, when an abnormal phenomenon occurs only by using such methods.

DISCLOSURE

Technical Problem

The present invention has been made in view of the above problems, and it is an object of the present invention to provide a battery pack having an energy discharging means and a fire extinguishing means provided therein.

Technical Solution

A battery pack according to the present invention to accomplish the above object is a battery pack including a plurality of battery cells, a case configured to receive the plurality of battery cells, an energy discharger configured to discharge energy of the battery pack when an abnormal phenomenon occurs, and a fire extinguisher configured to discharge aerosol at an operating temperature or higher in order to extinguish flames generated in the battery pack.

Also, in the battery pack according to the present invention, the plurality of battery cells may be received in the battery pack divided into two or more sections.

Also, in the battery pack according to the present invention, the energy discharger may include resistor having electrical resistance and an operating switch.

Also, in the battery pack according to the present invention, the energy discharger may be installed in only one of the two or more sections.

Also, in the battery pack according to the present invention, the energy discharger may be installed per section.

Also, the battery pack according to the present invention may further a controller configured to perform overall management of the battery pack and to control operation of the energy discharger.

Also, in the battery pack according to the present invention, the fire extinguisher may be disposed adjacent to the resistor of the energy discharger, and the temperature of the fire extinguisher may reach the operating temperature using thermal energy generated from the resistor when the abnormal heat generation phenomenon occurs.

Also, in the battery pack according to the present invention, the fire extinguisher may include a fire extinguishing chemical, a cooler, and a nozzle.

Also, in the battery pack according to the present invention, the fire extinguishing chemical may be an aerosol foaming compound (AFC) configured to be in a solid state at lower than the operating temperature and to be sprayed in aerosol form at higher than the operating temperature.

Also, in the battery pack according to the present invention, the AFC may include at least one of potassium nitrate, strontium nitrate, and magnesium nitrate.

Also, in the battery pack according to the present invention, the energy discharger and the fire extinguisher may be located in the case.

In addition, a device according to the present invention includes at least one battery pack according to the present invention.

Advantageous Effects

A battery pack according to the present invention has an advantage in that an energy discharging means and a fire extinguishing means are included such that, when an abnormal phenomenon, such as heat generation or fire outbreak, occurs in a specific battery cell in the battery pack, energy of the battery cell is rapidly discharged and the fire is suppressed, whereby it is possible to inhibit a thermal runaway phenomenon from propagating to a battery cell adjacent thereto.

In addition, the battery pack according to the present invention has an advantage in that the fire extinguishing means is operated using thermal energy generated from the energy discharging means when the abnormal phenomenon occurs, whereby no separate device configured to operate the fire extinguishing means is necessary.

DESCRIPTION OF DRAWINGS

FIG. 1 is a schematic view showing a battery pack according to an embodiment of the present invention.

FIG. 2 is a schematic view showing a battery pack according to another embodiment of the present invention.

FIG. 3 is a schematic view showing an energy discharging means of the present invention.

FIG. 4 is a schematic view showing a fire extinguishing means of the present invention.

BEST MODE

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a battery pack according to the present invention will be described with reference to the accompanying drawings.

FIG. 1 is a schematic view of a battery pack including an energy discharging means and a fire extinguishing means according to a first preferred embodiment of the present invention.

When describing the battery pack 10 with reference to FIG. 1, the battery pack 10 according to the present invention is configured such that a plurality of battery cells 100 is received in a battery pack case 200 in a state of being divided into two or more sections. A partition wall 500 configured to partition the sections from each other is located between the respective sections. A heat insulation plate configured to perform heat insulation between the sections or a heat dissipation plate or a cooling plate configured to discharge heat generated from the battery cell 100 to the outside may be used as the partition wall 500, as needed.

Meanwhile, as shown in FIG. 1, the energy discharging means 300 and the fire extinguishing means 400 are provided in each section, in which a plurality of battery cells 100 is received.

Here, the energy discharging means 300 serves to, when an abnormal heat generation phenomenon occurs in a specific battery cell 100 of the battery pack 10, discharge energy of the battery cell 100 as thermal energy, thereby inhibiting a thermal runaway phenomenon due to abnormal heat generation, thus improving safety of the battery pack 10.

In addition, the fire extinguishing means 400 is disposed adjacent to the energy discharging means 300, and the temperature of the fire extinguishing means reaches an operating temperature using thermal energy discharged by the energy discharging means 300 when an abnormal heat generation phenomenon occurs, whereby it is possible to rapidly extinguish flames in the battery pack 10.

FIG. 2 is a schematic view of a battery pack including an energy discharging means and a fire extinguishing means according to a second preferred embodiment of the present invention.

The battery pack 10 of FIG. 2 is identical to the battery pack 10 of FIG. 1 except that the energy discharging means 300 and the fire extinguishing means 400 are only provided in a middle section, among a plurality of divided sections, compared to the battery pack 10 of FIG. 1.

Meanwhile, when describing the energy discharging means 300 in detail with reference to FIG. 3, the energy discharging means 300 includes a resistor 310 having high electrical resistance and an operating switch 320 configured to turn on/off electrical connection with battery cells 100 in a specific section.

The resistor 310 may be selected from well-known resistors, as long as the electrical resistance of the resistor is capable of rapidly discharging energy of the battery cell 100 as thermal energy and the thermal energy is capable of providing temperature at which the fire extinguishing means 400 located adjacent thereto is operated.

In addition, the operating switch 320 may be provided in only one direction of a circuit, as shown in (a) of FIG. 3, or may be provided in both directions of a circuit, as shown in (b) of FIG. 3.

In the energy discharging means 300 described above, when an abnormal heat generation phenomenon occurs, the operating switch 320, which is off while the battery pack 10 is normally operated, is turned on, whereby the battery cell 100 and the resistor 310 are electrically connected to each other. As a result, electrical energy of the battery cell 100 is discharged as thermal energy by the resistor 310, which has high electrical resistance, and therefore it is possible to inhibit the abnormal heat generation phenomenon from propagating to battery cells 100 adjacent thereto.

In addition, the battery pack 10 may further include a controller (not shown) in order to perform overall management of the battery pack 10 and to control operation of the energy discharging means 300 when an abnormal heat generation phenomenon occurs.

When describing the fire extinguishing means 400 with reference to FIG. 4, the fire extinguishing means 400 may be a solid aerosol fire extinguishing device including a fire extinguishing chemical 410, a cooling portion 420, and a nozzle 430.

Here, the solid aerosol fire extinguishing device is a fire extinguishing system that interrupts chain reaction of combustion through a negative catalyst effect in which radicals of aerosol generated when a solid compound including special ingredients is burned react with active radicals, such as O, H, and OH, around a fire, in order to interrupt chain reaction, thereby suppressing the fire.

Specifically, when the fire extinguishing chemical 410 is burned at an operating temperature or higher, aerosol, which is a fire extinguishing material, is generated, the generated aerosol is cooled to an appropriate temperature harmless to human bodies or facilities while passing through the cooling portion 420, the cooled aerosol is sprayed as aerosol particles A through the nozzle 430, and the sprayed aerosol suppresses a fire through the negative catalyst effect described above.

Any of various well-known fire extinguishing chemicals may be used as the fire extinguishing chemical 410 of the fire extinguishing means 400. In particular, an aerosol foaming compound (AFC), which is in a solid state at lower than an operating temperature and which is sprayed in the form of aerosol at the operating temperature or higher, is preferably used.

It is preferable for at least one of potassium nitrate, strontium nitrate, and magnesium nitrate to be included as a main ingredient of the AFC. Since decomposition and combustion temperatures vary depending on ingredients of the AFC, it is necessary to set the size and specifications of the resistor to be applied to the energy discharging means 300 in consideration of the operating temperature of the AFC.

The operating temperature may have various temperature ranges depending on ingredients included in the AFC. In particular, a temperature range of 300 to 1100° C. is preferable in consideration of the kind of the AFC and the resistor 310 that are generally used.

In addition, the battery pack including the energy discharging means 300 and the fire extinguishing means 400 according to the present invention may be applied to an electric vehicle (EV), a hybrid electric vehicle (HEV), a plug-in hybrid electric vehicle (P-HEV), or an energy storage system (ESS).

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

DESCRIPTION OF REFERENCE SYMBOLS

10: Battery pack
100: Battery cell
200: Case
300: Energy discharging means
310: Resistor
320: Operating switch
400: Fire extinguishing means
410: Fire extinguishing chemical
420: Cooling portion
430: Nozzle
A: Aerosol particles
500: Partition wall

The invention claimed is:

1. A battery pack comprising:
a plurality of battery cells;
a case configured to receive the plurality of battery cells;
a resistor configured to discharge energy of the battery pack when a heat generation phenomenon occurs; and
at least one fire extinguisher configured to discharge aerosol at an operating temperature or higher in order to extinguish flames generated in the battery pack,
wherein the resistor supplies heat to the at least one fire extinguisher,
wherein the at least one fire extinguisher is disposed adjacent to the resistor, and a temperature of the at least one fire extinguisher reaches the operating temperature using thermal energy generated from the resistor when the heat generation phenomenon occurs, and
wherein the at least one fire extinguisher comprises:
a fire extinguishing chemical;
a cooler below the fire extinguishing chemical; and
a nozzle below the cooler,
wherein the aerosol passes through the cooler to be cooled, and
wherein the cooled aerosol passes through the nozzle after being cooled by passing through the cooler.

2. The battery pack according to claim 1, wherein the plurality of battery cells received in the battery pack is divided into two or more sections.

3. The battery pack according to claim 2, wherein the resistor is installed in only one of the two or more sections.

4. The battery pack according to claim 2, wherein the resistor is installed in each of the two or more sections.

5. The battery pack according to claim 1, further comprising a controller configured to perform overall management of the battery pack and to control operation of the resistor.

6. The battery pack according to claim 1, wherein the fire extinguishing chemical is an aerosol foaming compound (AFC) configured to be in a solid state at lower than the operating temperature and to be sprayed in aerosol form at higher than the operating temperature.

7. The battery pack according to claim 6, wherein the AFC comprises at least one of potassium nitrate, strontium nitrate, and magnesium nitrate.

8. The battery pack according to claim 1, wherein the resistor and the at least one fire extinguisher are located in the case.

9. A device comprising the battery pack according to claim 1.

10. The battery pack according to claim 1, further comprising a plurality of partitions dividing the plurality of battery cells into sections,
wherein the at least one fire extinguisher is a plurality of fire extinguishers, and
wherein each of the sections has one of the plurality of fire extinguishers.

* * * * *